(12) United States Patent
Hauck

(10) Patent No.: US 10,193,403 B2
(45) Date of Patent: Jan. 29, 2019

(54) ROTOR ARRANGEMENT FOR AN ELECTRICAL PRIME MOVER AND ELECTRIC PRIME MOVER AND ELECTRIC DRIVE SYSTEM

(71) Applicant: Dr. Ing. h.c. F. Porsche Aktiengesellschaft, Stuttgart (DE)

(72) Inventor: Christian Hauck, Ludwigsburg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 240 days.

(21) Appl. No.: 14/202,241

(22) Filed: Mar. 10, 2014

(65) Prior Publication Data

US 2014/0252911 A1 Sep. 11, 2014

(30) Foreign Application Priority Data

Mar. 11, 2013 (DE) .................... 10 2013 102 408

(51) Int. Cl.
| | |
|---|---|
| *H02K 1/22* | (2006.01) |
| *H02K 1/28* | (2006.01) |
| *H02K 15/16* | (2006.01) |
| *B60L 11/14* | (2006.01) |
| *B60L 15/20* | (2006.01) |
| *H02K 5/24* | (2006.01) |

(52) U.S. Cl.
CPC .............. *H02K 1/22* (2013.01); *B60L 11/14* (2013.01); *B60L 15/2054* (2013.01); *H02K 1/28* (2013.01); *H02K 15/165* (2013.01); *B60L 2210/40* (2013.01); *B60L 2220/14* (2013.01); *B60L 2220/50* (2013.01); *B60L 2240/423* (2013.01); *B60L 2240/486* (2013.01); *B60L 2240/507* (2013.01); *B60L 2270/142* (2013.01); *B60L 2270/145* (2013.01); *H02K 5/24* (2013.01); *Y02T 10/641* (2013.01); *Y02T 10/645* (2013.01); *Y02T 10/70* (2013.01); *Y02T 10/7077* (2013.01); *Y02T 10/7241* (2013.01); *Y02T 10/7275* (2013.01)

(58) Field of Classification Search
CPC .......... H02K 16/02; H02K 1/22; H02K 15/16; H02K 1/28; B60L 11/14; B60L 15/2054
USPC ............. 310/211, 212, 126, 261.1, 112–114, 310/156.36, 216, 51, 22, 268, 216.015, 310/216.016, 216.018; 180/65.1
See application file for complete search history.

(56) References Cited

U.S. PATENT DOCUMENTS 1,226,091 A * 5/1917 McCollum ............. H02K 27/06
310/112
4,110,642 A * 8/1978 Thiele ...................... H02K 1/16
310/216.017

(Continued)

FOREIGN PATENT DOCUMENTS

| DE | 19915664 | 10/2000 |
|---|---|---|
| DE | 102009047619 | 6/2011 |
| JP | 2002078304 | 3/2002 |

*Primary Examiner* — Tran Nguyen
(74) *Attorney, Agent, or Firm* — Gerald E. Hespos; Michael J. Porco; Matthew T. Hespos

(57) ABSTRACT

A rotor arrangement for an electric prime mover (6) of a motor vehicle has a rotor shaft (34), on which at least two laminate stacks (36, 38, 40, 42, 44, 46) are arranged. At least one laminate stack (36) is configured to enable a changed moment of inertia of this laminate stack (36) with respect to another laminate stack (38).

11 Claims, 3 Drawing Sheets

(56) References Cited

U.S. PATENT DOCUMENTS

| | | | | | |
|---|---|---|---|---|---|
| 4,127,786 | A | * | 11/1978 | Volkrodt | H02K 1/276 |
| | | | | | 310/156.84 |
| 6,002,190 | A | * | 12/1999 | Kieffer | H02K 1/20 |
| | | | | | 310/193 |
| 2002/0180304 | A1 | * | 12/2002 | Knauff | H02K 1/30 |
| | | | | | 310/261.1 |
| 2006/0163969 | A1 | * | 7/2006 | Nemoto | H02K 1/22 |
| | | | | | 310/261.1 |
| 2007/0261388 | A1 | * | 11/2007 | Kroepke | B60K 6/48 |
| | | | | | 60/273 |
| 2011/0094806 | A1 | * | 4/2011 | Mack | H02K 7/003 |
| | | | | | 180/65.6 |
| 2013/0140938 | A1 | * | 6/2013 | Kaiser | H02K 1/26 |
| | | | | | 310/216.117 |

* cited by examiner

ROTOR ARRANGEMENT FOR AN ELECTRICAL PRIME MOVER AND ELECTRIC PRIME MOVER AND ELECTRIC DRIVE SYSTEM

CROSS REFERENCE TO RELATED APPLICATION

This application claims priority under 35 USC 119 to German Patent Appl. No. 10 2013 102 408.4 filed on Mar. 11, 2013, the entire disclosure of which is incorporated herein by reference.

BACKGROUND

1. Field of the Invention

The invention relates to a rotor arrangement for an electric prime mover for a motor vehicle. The rotor arrangement has a rotor shaft, on which at least two laminate stacks consisting of a number of individual laminations are arranged. The invention also relates to an electric prime mover for a motor vehicle and to an electric drive system.

2. Description of the Related Art

Rotor arrangements have been used in motor vehicles and in recent times, electric prime movers have been used for driving drive wheels of a drive axle of a hybrid or electric vehicle. For example, these electric prime movers may have a rotor arrangement with at least two laminate stacks that transfer oscillations in the natural frequency range of the laminate stacks to coupled machine elements, such as transmissions. This transfer can have a disadvantageous effect on noise emissions of the machine elements and the expected life.

The object of the invention therefore consists in providing a rotor arrangement or an electric prime mover which avoids the above-described disadvantage in a simple and inexpensive manner.

SUMMARY OF THE INVENTION

The invention relates to a rotor arrangement that has at least one laminate stack with means for enabling a changed moment of inertia of this laminate stack with respect to another laminate stack. Thus, it is possible to provide scattering of the moments of inertia of the individual laminate stacks, which means that the moments of inertia of all of the laminate stacks can no longer be added given a certain self-resonant frequency and can therefore result in the mentioned oscillations.

The means for enabling a changed moment of inertia of the laminate stack with respect to another laminate stack may comprise geometric form elements, such as bores or cutouts. The means also may comprise material elements such as lightweight construction materials, introduction of heavy metals, etc.

The invention also relates to an electric prime mover for a motor vehicle comprising a housing with a stator arrangement and such a rotor arrangement.

The invention also relates to an electric drive system comprising such an electric prime mover. The electric prime mover can be drive-coupled to a drive axle of a motor vehicle. In this case, it is particularly advantageous if a transmission is provided. The transmission and the electric prime mover are arranged in a multi-part drive system housing, and the drive system housing is mounted on the drive axle via at least two bearings. This arrangement provides an extremely compact and high-performance embodiment for an electric drive system.

The invention is described in more detail below with reference to the drawings.

DETAILED DESCRIPTION OF THE PREFERRED EMBODIMENTS

Figure 1:
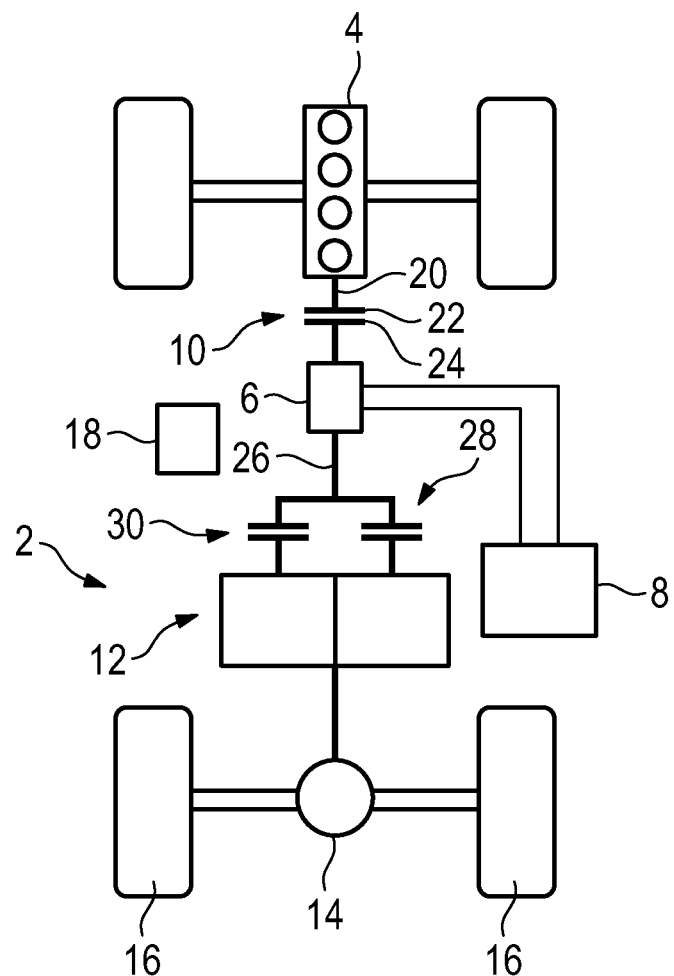
FIG. 1 shows a schematic view of a drive train of a motor vehicle.

FIG. 1 shows an example of a hybrid drive train 2 for a motor vehicle. The hybrid drive train 2 is a parallel hybrid drive. More particularly, the drive train 2 has an internal combustion engine 4, an electric prime mover 6 that can also be operated as a generator, a high-voltage source 8, a disconnect clutch 10 and a double clutch transmission 12 that transfers torque onto the rear wheels 16 via a differential 14. The electric prime mover 6 in this embodiment is a permanent magnet synchronous motor, with a stator arrangement and a rotor arrangement 32 (see FIG. 2) provided in the housing of said synchronous motor in a known manner. A control device 18 also is provided. The internal combustion engine 4 has a motor shaft 20 connected in torsionally rigid fashion to a first clutch element 22 of the disconnect clutch 10. A second clutch element 24 of the disconnect clutch 10 is connected in torsionally rigid fashion to the transmission input shaft 26 via a rotor shaft 34 illustrated in FIG. 2. The transmission input shaft 26 acts on the double clutch transmission 12, which, in a known manner, has a first transmission clutch 28 and a second transmission clutch 30.

Figure 2:
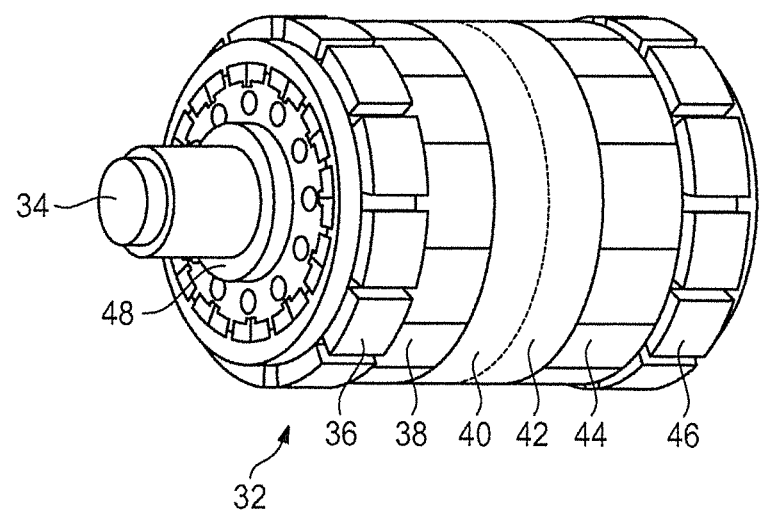
FIG. 2 is a perspective view of a rotor arrangement of the invention.

FIG. 2 is a perspective illustration of a rotor arrangement 32 of the electric prime mover 6. As already mentioned, the rotor arrangement 32 has the rotor shaft 34, on which six laminate stacks 36, 38, 40, 42, 44, 46 are arranged in a known manner. The laminate stacks 36, 38, 40, 42, 44, 46 are secured by corresponding support discs 48. In conventional rotor arrangements, the laminate stacks 36, 38, 40, 42, 44, 46 are designed uniformly in terms of their moment of inertia. Thus, the oscillations due to self-resonant frequencies of the individual laminate stacks 36, 38, 40, 42, 44, 46 can be added, as a result of which these oscillations can be introduced into the adjoining machine elements, such as the disconnect clutch 10 and the double clutch transmission 12. To prevent this problem, provision is made according to the invention for only the laminate stacks 36 and 46; 38 and 44 and 40 and 42 to have identical moments of inertia, or in other words for these three pairs have different moments of inertia. Hence, there is no longer simultaneous oscillation in the self-resonant frequency range.

Figure 3:
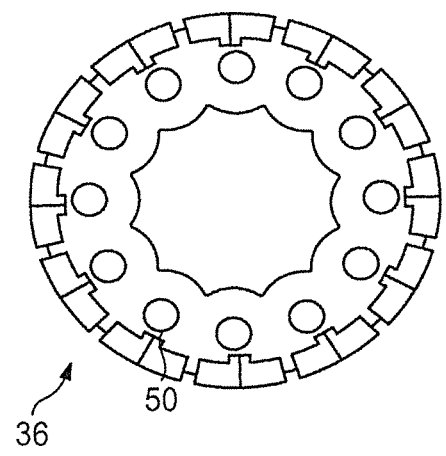
FIG. 3 is a detail view of a laminate stack.

By way of example the laminate stack 36 in FIG. 3 has different moments of inertia by providing geometric form elements, in this case bores 50 that reduce the moment of inertia of the laminate stack 36. However, it is also possible for this change in the moment of inertia to be ensured via lightweight construction material or the introduction of heavy metals.

Figure 4:
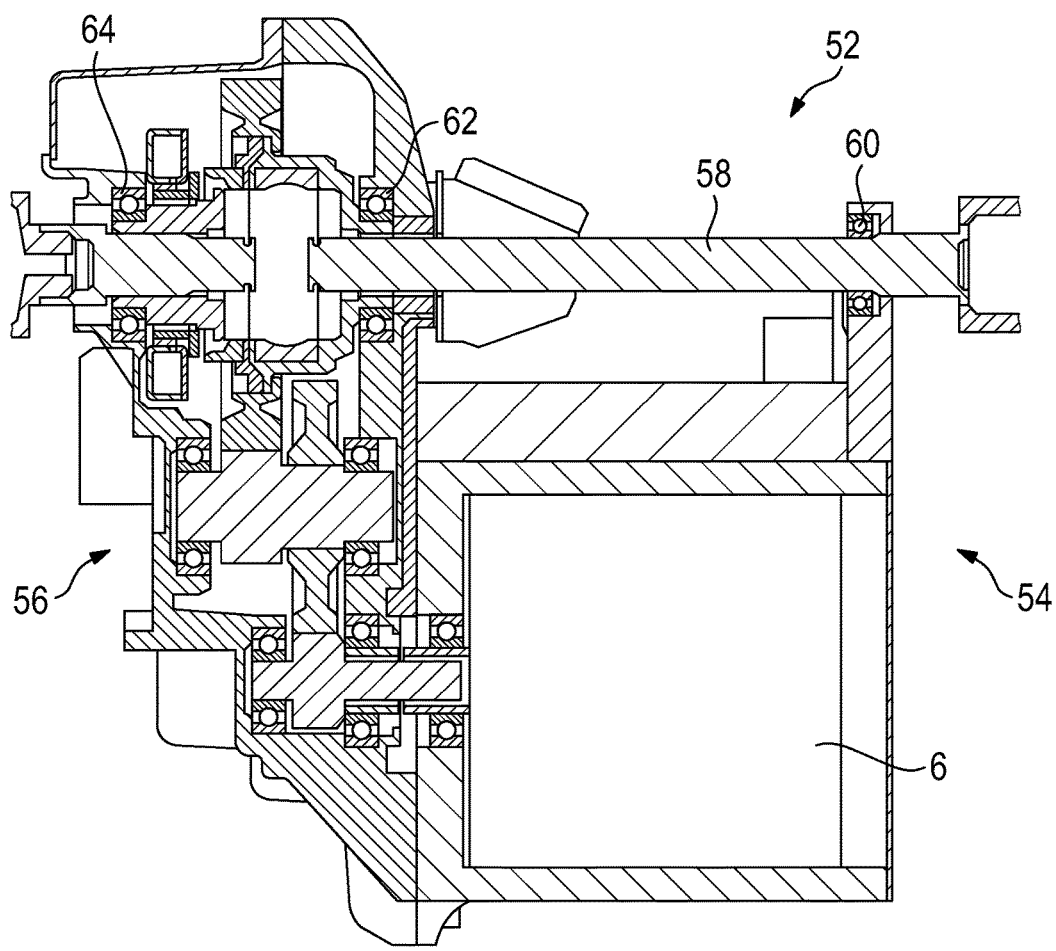
FIG. 4 shows a schematic cross-sectional view of an embodiment of an electric drive system.

FIG. 4 is a schematic cross-sectional view of an electric drive system 52. The electric drive system has one multi-part drive system housing 54 in which the electric prime mover 6 is arranged. The electric prime mover 6 is drive-coupled to a drive axle 58, in this case is a front axial, via a three-shaft transmission 56. The multi-part drive system housing 54 is mounted on the drive axle via three bearings 60, 62, 64. This arrangement provides an extremely compact, high-performance electric drive system.

What is claimed is:

1. A rotor arrangement for an electric prime mover of a motor vehicle, the rotor arrangement comprising:
   a rotor shaft extending in an axial direction;
   a first pair of laminate stacks arranged side-by-side on the rotor shaft;
   a second pair of laminate stacks arranged on the rotor shaft and separated from each other by the first pair of laminate stacks; and
   a third pair of laminate stacks arranged on the rotor shaft and separated from each other by the first and second pairs of laminate stacks, wherein
   the laminate stacks in a selected pair of the first, the second and the third pairs of laminate stacks are configured so that each of the laminate stacks in the selected pair of laminate stacks has a moment of inertia and a self-resonant frequency that are substantially different from the moments of inertia and self-resonant frequencies of the laminate stacks in the other two pairs of the first, the second and the third pairs of laminate stacks so that the self-resonant frequencies of the laminate stacks in the first, second and third pairs of laminate stacks at least partly offset one another to counteract oscillations that adversely affect other parts of the motor vehicle.

2. The rotor arrangement of claim 1, further comprising support discs configured to secure the first, second, and third pair of laminate stacks with respect to the rotor shaft.

3. The rotor arrangement of claim 1, wherein the laminate stacks in the selected pair of laminate stacks comprise bore holes that make the moment of inertia and the self-resonant frequency of each laminate stack in the selected pair of laminate stacks substantially different from the moments of inertia and the second self-resonant frequencies of the laminate stacks in the other pairs of laminate stacks to counteract the oscillations that adversely affect other parts of the motor vehicle.

4. The rotor arrangement of claim 1, wherein the laminate stacks in the selected pair of laminate stacks comprise material elements provided on the laminate stacks in the selected pair of laminate stacks so that the moments of inertia and the self-resonant frequencies of the laminate stacks in the selected pair of laminate stacks are different from the laminate stacks in the other two pairs of the first, the second and the third pairs of laminate stacks to counteract the oscillations that adversely affect other parts of the motor vehicle.

5. An electric prime mover comprising the rotor arrangement of claim 1 arranged in a multi-part drive system housing of the motor vehicle.

6. An electric drive system comprising the electric prime mover of claim 5, the electric prime mover being drive-coupled to a drive axle of the motor vehicle.

7. The electric drive system of claim 6, further comprising a transmission, wherein the transmission and the electric prime mover are arranged in the multi-part drive system housing, and wherein the drive system housing is mounted on the drive axle via at least two bearings.

8. A drive train for a motor vehicle, comprising:
   at least one machine element; and
   an electric prime mover coupled to the at least one machine element, the electric prime mover including:
   a rotor shaft coupled to the machine element;
   first and second laminate stacks arranged on the rotor shaft, the first and second laminate stacks having-a first moments of inertia and a first resonant frequencies; and
   third and fourth laminate stacks arranged on the rotor shaft, the third and fourth laminate stacks being configured so that the third and fourth laminate stacks have predetermined second moments of inertia that are substantially different from the first moments of inertia to prevent oscillations of the third and fourth laminate stacks at the first resonant frequency, thereby counteracting oscillations applied by the first and second laminate stacks to the machine element.

9. The drive train of claim 8, wherein the at least one machine element comprises a double clutch transmission.

10. The drive train of claim 9, wherein the third and fourth laminate stacks have bore holes formed therein so that the third and fourth laminate stacks have the specified second moments of inertia.

11. The drive train of claim 9, wherein the third and fourth laminate stacks have construction materials introduced into the third and fourth laminate stacks in a substantially amount to achieve the specified second moment of inertia.

* * * * *